Figure 1:
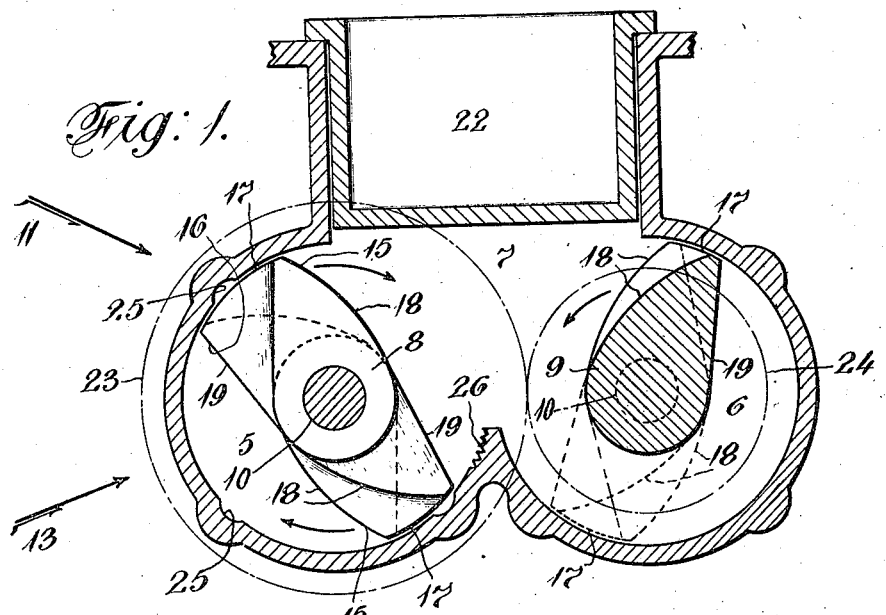

F. H. BANBURY.
MACHINE FOR TREATING RUBBER AND OTHER HEAVY PLASTIC MATERIAL.
APPLICATION FILED JAN. 13, 1916.

1,200,070.

Patented Oct. 3, 1916.

WITNESSES:
John J. Kittel
L. L. Browning

INVENTOR
Fernley H. Banbury
BY
Edward C. Davidson
ATTORNEY

UNITED STATES PATENT OFFICE.

FERNLEY H. BANBURY, OF EAST ORANGE, NEW JERSEY, ASSIGNOR TO BIRMINGHAM IRON FOUNDRY, OF DERBY, CONNECTICUT, A CORPORATION OF CONNECTICUT.

MACHINE FOR TREATING RUBBER AND OTHER HEAVY PLASTIC MATERIAL.

1,200,070.   Specification of Letters Patent.   Patented Oct. 3, 1916.

Application filed January 13, 1916. Serial No. 71,961.

*To all whom it may concern:*

Be it known that I, FERNLEY H. BANBURY, a subject of the King of Great Britain, residing in East Orange, county of Essex, and State of New Jersey, have invented certain new and useful Improvements in Machines for Treating Rubber and Other Heavy Plastic Material, of which the following is a specification.

This invention relates to that class of machines in which revolving blades act in conjunction with stationary surfaces adapted to treat plastic materials and mix other substances therewith.

The object of this invention is to increase the efficiency of machines of this class for preparing rubber, etc., for industrial purposes. To this end the active or working faces of the blades are so formed as to be at acute angles to the stationary surfaces so that as they revolve around or over the same they, by wedging action, press the rubber or other material being treated with considerable force against said surfaces and at the same time by their pushing action of rotation impart to the rubber rolling, kneading and squeezing actions under considerable pressure, thus insuring a thorough working by changes of position of all parts of the mass being treated. The sliding action of the inclined blade tends to impart a smearing action on the rubber.

Another feature of this invention is that the angular direction of the blades relative to the axis of the rotors is such that the leading ends of the blades are adjacent the ends of the cylindrical chambers with their other ends at or near the centers of the rotors and when two or more blades are used the inner ends of said active surfaces extend from the two ends of the rotor and preferably overlap. By this arrangement, the material being treated is caused to flow or move from the ends toward the center and as the portion of the material in front of a blade passes over its inner end, which it does under a dragging or drawing out action, it is taken up by a blade extending from the other end of the device to be similarly treated and passed again to central position and discharged from the inner end of this blade on to the first mentioned blade. The lines of the active surfaces extending from the hub or boss to the peripheries of the blades may be right lines to impart the desired acuteness of the angle between the active surfaces and the stationary surfaces, or such lines may be curved to any desired extent to cause squeezing action on the rubber, etc. by an increase in the acuteness of the angle as the apex of the angularly arranged surfaces is approached.

In practice it is preferred to make the machines of a duplex character, that is with two cylindrical chambers with a communicating chamber between them, into which the material to be treated is fed, each being provided with a rotor having the inclined blades of this invention. The material carried over by the two rotors into the communicating chamber will intermingle therein, portions of it will interchange between the rotors and their inclosing cylindrical beds and thus insure a thorough and rapid admixture of, and efficient action on, the materials being treated. A weight fitted to slide freely in the upper part of the communicating chamber may be used to press on the rubber to insure proper feeding action of the blades thereon.

To more fully describe the invention reference will now be had to the accompanying drawing, which conventionally illustrates a rubber treating machine with my improvements applied thereto, all unnecessary details being omitted.

Figure 2:
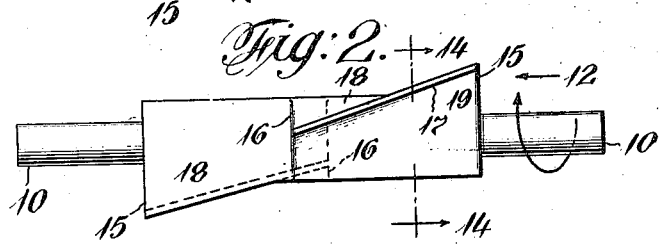
Figure 3:
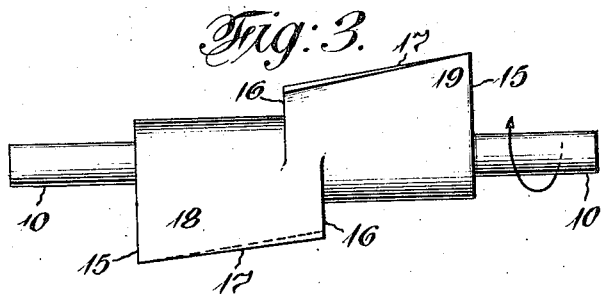

Figure 1 is an outline view showing two chambers, each provided with the rotor of this invention, partly in section: Fig. 2, a plan view of one of the rotors looking in direction of arrow 11 of Fig. 1 showing the general arrangement of the inclined blades: Fig. 3, another view of the rotor looking in the direction of arrow 13, Fig. 1: and Fig. 4, an end view of a rotor showing a modified form of the inclined blades.

As indicated in Fig. 1 an embodiment of the invention is in a machine comprising two cylindrical chambers 5 and 6 arranged side by side whose upper parts open into a communicating chamber 7. Rotating devices or rotors 8 and 9 axially rotate in the chambers 5 and 6 by the trunnions 10 working in bearings on the end walls of the chambers. The rotors are provided with blades or wings whose peripheral edges are adjacent the cylindrical walls or beds of the chambers 5—6. They are similar in all essential respects but are adapted to rotate and act on rubber or other material placed in the chambers in opposite directions.

The shape and functional operation of the blades of the rotors will be understood from an examination of the different views of the drawing. Fig. 2 is a plan view looking at the rotor located in chamber 5, in direction indicated by arrow 11, Fig. 1; this rotor is seen in chamber 5 of Fig. 1 as an end view of Fig. 2 directed by arrow 12. Fig. 3 shows the rotor in elevation, looking in direction as indicated by arrow 13 of Fig. 1 and the rotor shown in chamber 6 is in cross section taken on line 14—14, Fig. 2. The rotors are shown provided with two blades diametrically arranged, the machine being shown as of a duplex character. In some cases they may have one blade, in others more than two, and a single cylindrical treating chamber may be used according to the size of the machine and the kind of material to be treated. The forward or leading edge 15 of each blade is at an end of the rotor and is close to an end wall of the chamber, the inner or discharge end 16 being at or near the center of the rotor but some distance from the opposite end of the rotor. The peripheral edge 17 joins the outer points of edges 15 and 16. It works adjacent the cylindrical wall or bed of the chamber and is inclined relative to the axis of the rotor from the leading edge toward the center, as are all longitudinal lines between edges 15 and 16 of the working face 18 which is bounded by the edges 15, 16 and 17 and merges into the hub or boss of the rotor. The inner or centrally located edges 16 of the blades, where two or more are used, overlap so that the material acted upon by face 18 is caused to move or flow longitudinally therealong toward the center, and flows over the edge 16 in front of the active face 18 of the diametrically disposed blade to be, by said blade, forced toward or beyond the center so as to be again under the influence of the active face 18 of the first mentioned blade. The material as it gradually passes over an edge 16 of one of the blades is still under the influence of such edge, as it is a continuous mass, before it is fully acted upon by the other blade, the effect of the continuing rotation of said edge 16 on the material being to further work or impart mobility to the constituents of the material by a drawing-out action on its mass.

Figure 4:
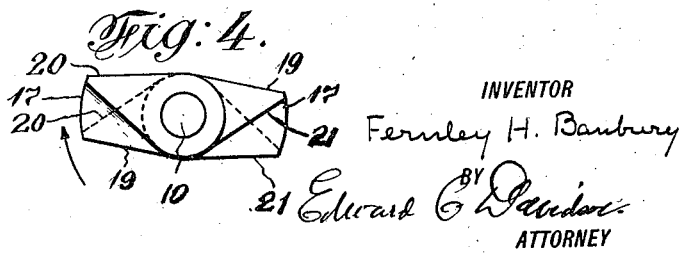

An important feature of the invention resides in so shaping and arranging the transverse lines of the active faces 18 that its surface is at an acute angle to the stationary co-acting bed, and said lines are preferably curved lines as shown in the main views of the drawing, or they may be straight lines as shown at 20 and 21, Fig. 4. Whether curved or straight they, by wedging action as the blades rotate, forcibly press the material against the bed thus greatly increasing the rolling, kneading, etc., effects as the material is forced ahead of the active faces of the blades.

The surfaces 19 constituting the rear sides of the blades may be practically planes being bounded by straight lines connecting outer ends of edges 15 and 16 on the hub of the rotor and the peripheral edge 17.

The width of the mouth of the communicating chamber 7 connecting the cylindrical chambers 5 and 6, that is the distance it extends over said chambers 5 and 6, will be governed by the size of the machine, location of rotors, and other considerations. In this mouth is located a weight plunger 22 whose function is to hold the material placed in the machine down in position to be acted on by the blades which have, more or less, a tendency, due to their curvature, to force some of the material back into the mouth. This is resisted by the weight which, fitting freely in the mouth, floats on the surface of the material.

The rotors 5 and 6 may in some cases be caused, by suitable gearing applied in well known manner to their trunnions 10, to travel at uniform speeds. In other cases, their speeds may be variable. Generally it is preferable to cause them to rotate at different speeds which may be done by connecting gear wheels whose pitch circles are indicated by 23 and 24.

The angle of the active faces relative to the stationary bed and also the angularity of the blades relative to the axis of the rotor may be varied to meet special conditions under which the machines for treating heavy plastic materials are to be used.

The cylindrical walls of the chambers may be plain as shown at the right hand of Fig. 1 or be provided with grooves 25, affording pockets for the relief of excessive pressure on the material being treated, as shown at the left, or the whole of the surfaces or parts thereof may be serrated as at 26.

I claim:

1. A machine for treating rubber and other heavy plastic materials, comprising a cylindrical bed, a rotor having a blade whose active face throughout its length is, in planes at right angles to the axis of the rotor, transversely inclined at an acute angle to the cylindrical co-acting bed.

2. A machine for treating rubber and other heavy plastic materials, comprising a cylindrical bed, a rotor having a blade whose active face throughout its length is, in planes at right angles to the axis of the rotor, transversely curved so as to be inclined at an acute angle to the cylindrical co-acting bed.

3. In a machine for treating rubber and other heavy plastic materials, comprising a cylindrical bed and a mouth through which the material is fed to the cylinder, in combination with a floating weight located in the mouth and a rotor having a blade whose active face is transversely inclined at an acute angle to the cylindrical co-acting bed.

4. In a machine for treating rubber comprising two cylindrical chambers, and a communicating chamber between them, in combination with rotors in the cylindrical chambers, each having blades transversely curved to form acute angles with the cylindrical beds and also inclined from the ends of the rotors toward their centers with their inner or central ends overlapping, whereby the material being treated is caused to move or flow from the ends of the cylindrical chambers to their central parts and a floating weight in the feeding mouth of the communicating chamber adapted to bear on the material therein contained.

5. A machine for treating rubber and other heavy plastic materials, comprising a cylindrical bed, longitudinal relief grooves formed in the bed, a rotor having a blade whose active face is transversely curved so as to be inclined at an acute angle to the cylindrical co-acting bed and longitudinally inclined relatively to the axis of the rotor and having its forward or leading edge at one end of the rotor and with its inner or discharge edge located some distance from the other end of the rotor, whereby the material being treated is caused to move or flow toward the center of the rotor.

6. A machine for treating rubber and other heavy plastic materials, comprising a cylindrical bed having its surface partly or wholly serrated, a rotor having a blade whose active face is transversely curved so as to be inclined at an acute angle to the cylindrical co-acting bed and longitudinally inclined relatively to the axis of the rotor and having its forward or leading edge at one end of the rotor and with its inner or discharge edge located some distance from the other end of the rotor, whereby the material being treated is caused to move or flow toward the center of the rotor.

7. A machine for treating rubber and other heavy plastic materials, comprising a cylindrical bed having its surface partly or wholly serrated, longitudinal grooves formed in the bed, a rotor having a blade whose active face is transversely curved so as to be inclined at an acute angle to the cylindrical co-acting bed and longitudinally inclined relatively to the axis of the rotor and having its forward or leading edge at one end of the rotor and with its inner or discharge edge located some distance from the other end of the rotor, whereby the material being treated is caused to move or flow toward the center of the rotor.

In testimony whereof, I have hereunto subscribed my name.

FERNLEY H. BANBURY.

Witnesses:
L. L. BROWNING,
LAURA E. SMITH.